UNITED STATES PATENT OFFICE.

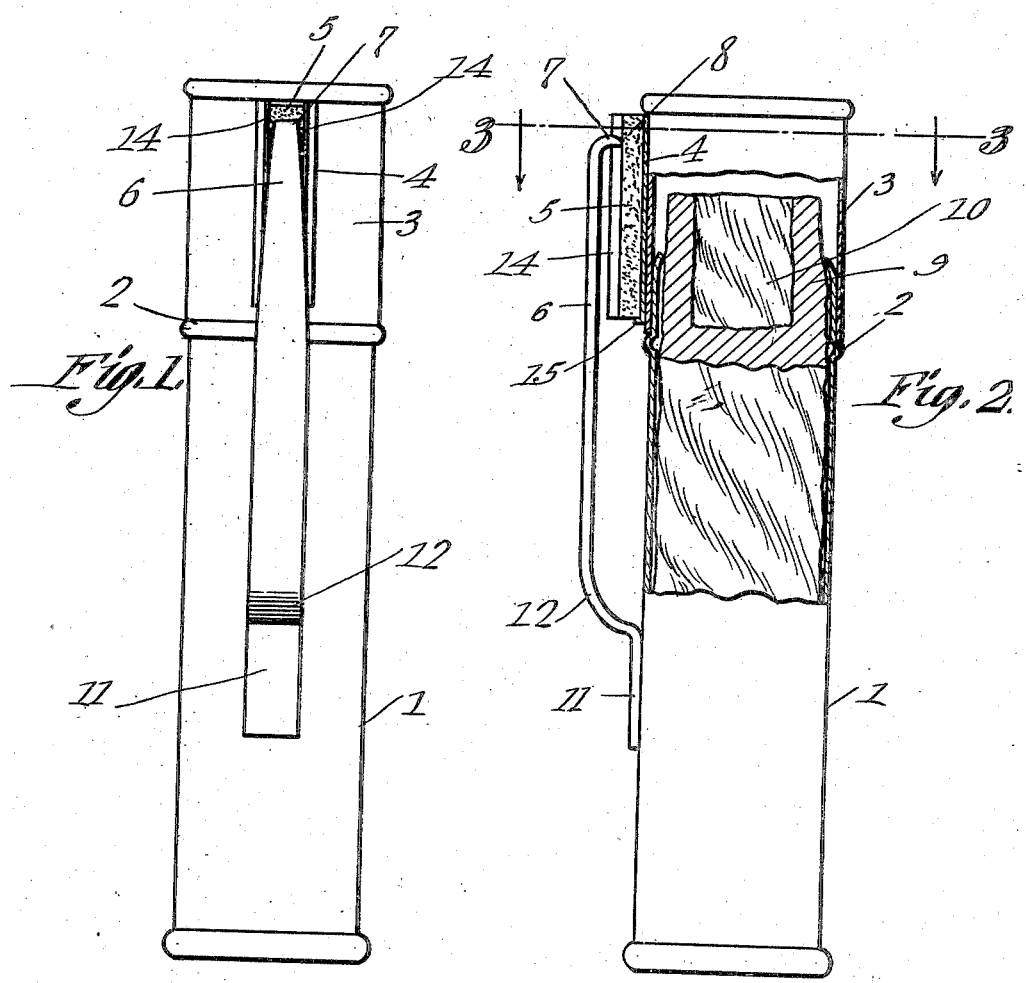

CHARLES FREDERICK LARSEN, OF CHICAGO, ILLINOIS.

CIGAR-LIGHTER.

1,325,894.	Specification of Letters Patent.	Patented Dec. 23, 1919.

Application filed November 2, 1918. Serial No. 260,833.

*To all whom it may concern:*

Be it known that I, CHARLES FREDERICK LARSEN, a citizen of the United States, residing at Chicago, in the county of Cook and State of Illinois, have invented a new and useful Cigar-Lighter, of which the following is a specification.

The device forming the subject matter of this application is a lighter adapted to be carried in the pocket for the purpose of igniting cigars and adapted to be used in other ways under circumstances which call for the rapid production of a flame. The invention aims to provide a simple device, wherein, by the removal of a cap from a casing, a striker will coact with a pyrophoric element. It is within the province of the disclosure to improve generally and to enhance the utility of, devices of that kind to which the invention appertains. But one form of the invention is shown as an illustration, but, of course, a mechanic, within the scope of the skill which he might be expected to possess, may work changes in the particular form shown, within the purview of what is claimed, without departing from the spirit of the invention.

In the drawings:—Figure 1 is a side elevation; Fig. 2 is a longitudinal section; Fig. 3 is a cross section on the line 3—3 of Fig. 2.

The numeral 1 marks a tubular casing having a circumscribing stop bead 2. A cap 3 is mounted on the open end of the casing 1 and carries a longitudinally disposed trough-shaped holder 4, wherein is secured a correspondingly elongated pyrophoric element 5. A striker 6 forms a part of the invention and, preferably, consists of a spring tongue extended longitudinally of the casing 1, one end of the striker being secured at 11 to the casing, the striker being offset as at 12, and terminating in an inwardly projecting finger 7, located beyond the open end of the casing and sharpened to present an edge 8 which is pressed yieldingly against the pyrophoric element 5, since the striker 6 is resilient. It is to be observed that the side walls of the holder 4 project as shown at 14, slightly beyond the outer or working face of the pyrophoric element 5. The fuel-holding means may be of any desired sort, but a wick 9 in the casing 1, having a receiving recess 10 in its outer end, will answer the purpose. A liquid fuel is employed and gasolene may be used to advantage.

When the cap 3 is pulled off the casing 1 by a right-line movement, the edge 8 of the striker 6 coöperates with the pyrophoric element 5 and produces a spark which ignites the fuel carried by the wick 9. Since the pyrophoric element 5 and the striker 6 are located, respectively, on the outside of the cap 3 and the casing 1, the pyrophoric element and the striker are shielded from the fuel and will not be soiled thereby, it being difficult or impossible to produce a spark, if the parts alluded to are soiled with fuel. Because the finger 7 of the striker bears yieldingly against the pyrophoric element 5, the striker aids in holding the cap 3 on the casing 1. The stop bead 2 limits the sliding movement of the cap 3 upon the casing 1, and, consequently, the finger 7 always rests on the outer surface of the pyrophoric element 5 and does not snap down on the end of the pyrophoric element when the cap is in place. Therefore, it is never necessary to prize out the striker 6, before the cap 3 can be pulled off the casing 1. Since the side walls of the holder 4 project as at 14, slightly beyond the outer surface of the pyrophoric element 5 the finger 6 will not slip off the pyrophoric element, should a slight rotary component enter into the movement which produces a withdrawal of the cap 3 from the casing 1. The thumb or finger of the operator may be pressed against the striker 6, so as to increase the pressure with which the finger 7 bears against the pyrophoric element 5. This operation may be resorted to at any time, but, ordinarily, the resiliency of the striker 6 will be sufficient to produce a spark when the finger 7 coöperates with the pyrophoric element. However, should the striker 6 lose some of its resiliency, then the fact that the striker may be thumb-pressed, is of importance.

Having thus described the invention, what is claimed is:—

A pocket lighter comprising as coöperating parts, a fuel-holding casing and a cap mounted on the casing for right-line sliding movement and freely separable from the casing, one of said coöperating parts being provided with a pyrophoric element, and the other of said coöperating parts being provided with a striker coacting with the pyrophoric element when the cap is removed from the casing, the lighter being characterized by the fact that the pyrophoric element and the striker are located on the outside of the respective parts whereby they are carried, the striker being in the form of a resilient member bearing upon the pyrophoric element to aid in holding the cap on the casing.

In testimony that I claim the foregoing as my own, I have hereto affixed my signature in the presence of two witnesses.

CHARLES FREDERICK LARSEN.

Witnesses:
L. WURZBURG,
A. C. COOKE.